(12) United States Patent
Hvid et al.

(10) Patent No.: US 12,514,972 B2
(45) Date of Patent: Jan. 6, 2026

(54) CONTROL OF BALLOON SIZE IN BOWEL IRRIGATION SYSTEM

(71) Applicant: Coloplast A/S, Humlebaek (DK)

(72) Inventors: Niels Hvid, Vedbaek (DK); Jakob Duus Dolriis, Birkeroed (DK); Ian James Rowe, Vaerloese (DK)

(73) Assignee: Coloplast A/S, Humlebaek (DK)

( * ) Notice: Subject to any disclaimer, the term of this patent is extended or adjusted under 35 U.S.C. 154(b) by 801 days.

(21) Appl. No.: 17/602,777

(22) PCT Filed: Apr. 3, 2020

(86) PCT No.: PCT/DK2020/050093
§ 371 (c)(1),
(2) Date: Oct. 11, 2021

(87) PCT Pub. No.: WO2020/207547
PCT Pub. Date: Oct. 15, 2020

(65) Prior Publication Data
US 2022/0143372 A1 May 12, 2022

(30) Foreign Application Priority Data
Apr. 11, 2019 (DK) .......................... PA 2019 70229

(51) Int. Cl.
*A61M 3/02* (2006.01)
*A61M 25/04* (2006.01)
*A61M 25/10* (2013.01)

(52) U.S. Cl.
CPC ........ *A61M 3/0258* (2013.01); *A61M 3/0245* (2013.01); *A61M 3/0295* (2013.01);
(Continued)

(58) Field of Classification Search
CPC .............. A61M 3/0254; A61M 3/0295; A61M 25/10181; A61M 25/10184;
(Continued)

(56) References Cited

U.S. PATENT DOCUMENTS

| 4,617,011 A | 10/1986 | Bloxom, Jr. |
| 5,019,056 A | 5/1991 | Lee et al. |

(Continued)

FOREIGN PATENT DOCUMENTS

| CA | 3030143 A1 | 1/2019 |
| DE | 202006017507 U1 | 10/2007 |

(Continued)

*Primary Examiner* — Michael J Tsai
*Assistant Examiner* — Forrest Blake Dipert
(74) *Attorney, Agent, or Firm* — Coloplast Corp., Coloplast A/S; Nick Baumann (57) ABSTRACT

A bowel irrigation system comprising a container adapted for containing a liquid, a catheter comprising an inflated balloon, a tubing connecting the container and the catheter, a pump, a control unit for controlling a flow of fluid in the system, and a pressure sensor is disclosed. The system comprises means for deflating the balloon, as a response to an assessment of a first pressure inside the balloon being greater than a first threshold value, by reducing the amount of liquid inside the balloon by a first amount of liquid. In addition, a method for deflating an inflatable balloon, as a response to an assessment of a first pressure inside the balloon being greater than a first threshold value, by reducing the amount of liquid inside the balloon by a first amount of liquid is disclosed.

12 Claims, 6 Drawing Sheets

(52) U.S. Cl.
CPC ............... *A61M 25/10181* (2013.11); *A61M 25/10184* (2013.11); *A61M 3/0202* (2021.05); *A61M 25/04* (2013.01); *A61M 2205/3337* (2013.01); *A61M 2205/3344* (2013.01); *A61M 2210/1064* (2013.01); *A61M 2210/1067* (2013.01)

(58) Field of Classification Search
CPC ...... A61M 25/10185; A61M 25/10187; A61M 2025/1052; A61M 2210/1067; A61M 2210/1064; A61F 5/442
See application file for complete search history.

(56) References Cited

U.S. PATENT DOCUMENTS

| | | | |
|---|---|---|---|
| 6,595,971 B1 | 7/2003 | Von Dyck et al. | |
| 7,294,120 B1 | 11/2007 | Edisen et al. | |
| 2003/0073963 A1 | 4/2003 | Falconer | |
| 2005/0054996 A1 | 3/2005 | Gregory | |
| 2005/0055043 A1* | 3/2005 | Foltz | A61M 29/02 606/193 |
| 2006/0009732 A1 | 1/2006 | Hardy | |
| 2009/0143722 A1 | 6/2009 | Kim | |
| 2010/0174252 A1 | 7/2010 | Tanghoej et al. | |
| 2010/0268154 A1 | 10/2010 | Vining | |
| 2011/0220119 A1* | 9/2011 | Lowenstein | A61M 25/10184 128/207.15 |
| 2012/0130347 A1 | 5/2012 | Budig et al. | |
| 2012/0143168 A1 | 6/2012 | Bjerregaard | |
| 2013/0116559 A1* | 5/2013 | Levin | A61B 8/00 604/257 |
| 2013/0331781 A1 | 12/2013 | Andreen | |
| 2014/0005602 A1 | 1/2014 | Andreen et al. | |
| 2014/0012235 A1* | 1/2014 | Pinchuk | A61M 25/10185 604/544 |
| 2014/0052063 A1* | 2/2014 | Gregory | A61M 16/0443 604/99.01 |
| 2014/0088362 A1* | 3/2014 | Terliuc | A61M 25/1034 600/116 |
| 2014/0296831 A1 | 10/2014 | Gobel | |
| 2014/0343409 A1* | 11/2014 | Purtell | A61B 5/6853 600/425 |
| 2016/0114148 A1 | 4/2016 | Holm et al. | |
| 2016/0206805 A1 | 7/2016 | Hassidov et al. | |
| 2017/0087284 A1 | 3/2017 | Shtul | |
| 2017/0259045 A1* | 9/2017 | Pinchuk | A61M 25/0017 |
| 2017/0348138 A1* | 12/2017 | Hvid | A61M 3/0216 |
| 2018/0177937 A1 | 6/2018 | Eliasson et al. | |
| 2020/0061282 A1* | 2/2020 | Hvid | A61M 3/022 |

FOREIGN PATENT DOCUMENTS

| | | |
|---|---|---|
| WO | 11139498 A1 | 11/2011 |
| WO | 12120456 A2 | 9/2012 |
| WO | 13076446 A1 | 5/2013 |
| WO | 16095928 A1 | 6/2016 |
| WO | 16095929 A1 | 6/2016 |
| WO | 17101954 A1 | 6/2017 |
| WO | WO-2018077361 A1 * | 5/2018 ........ A61M 25/0009 |

* cited by examiner

CONTROL OF BALLOON SIZE IN BOWEL IRRIGATION SYSTEM

The present disclosure relates to a bowel irrigation system capable of controlling the size of an inflated balloon during a bowel irrigation procedure. Moreover, the present disclosure relates to a method for controlling the size of an inflatable balloon of a bowel irrigation system.

BACKGROUND

Bowel irrigation is one of a number of treatments used to aid people with bowel problems. People suffering from bowel problems are often paralyzed, typically due to spinal cord injuries, and confined to a wheelchair or hospitalized. In these situations, often the peristaltic functions, i.e. the reflexes and muscles of the bowel, cannot be stimulated correctly. This results in constipation or random discharge of bowel contents. By using bowel irrigation, a stimulation of the peristaltic movements of the colon can be provided. To perform such bowel irrigation, a device comprising a catheter, also referred to as an anal catheter, anal probe, rectal catheter, or speculum, is provided. The catheter is inserted into the rectum through the anus. The catheter is typically retained in the rectum by retention means, most commonly a balloon, which is inflated against the wall of the rectum. A liquid, also referred to as an irrigation liquid, such as water or a saline solution, is then introduced into the rectum/bowels through the catheter. The amount of liquid is generally up to 1.5 liters, depending on the person. The introduced liquid stimulates the peristaltic movements of the bowel. After a specified period of time, such as 15 minutes, the catheter is removed, and the liquid, along with output from the bowel, is released through the anus.

BRIEF DESCRIPTION OF THE DRAWINGS

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following, whenever referring to a proximal end of an element of the invention, the referral is to the end adapted for insertion. Whenever referring to the distal end of an element, the referral is to the end opposite the insertion end. In other words, the proximal end is the end closest to the user, when the catheter is to be inserted and the distal end is the opposite end—the end furthest away from the user when the catheter is to be inserted. The longitudinal direction is the direction from the distal to the proximal end. The transverse direction is the direction perpendicular to the longitudinal direction, which corresponds to the direction across the shaft of the catheter.

In the following, whenever referring to a bowel irrigation system or bowel irrigation, the referral to a system or method capable of irrigating the bowels of a user using a catheter. Commonly, the catheter is inserted through the anus. Bowel irrigation (systems) is also known in the art as anal irrigation (systems) and rectal irrigation (systems), and the terms may be used interchangeably in embodiments where the bowel irrigation system is adapted for use through the anus.

In the following, whenever referring to the bowel(s) of a user, the referral is to the intestines of the user. The referral can be to the lower intestines specifically, e.g. the rectum and/or the colon/large intestine. In the following, whenever referring to the rectum, the referral is to the terminal section/canal of the intestine ending in the anus. In the following, whenever referring to the anus, the referral is to the opening of the lower end of the alimentary canal, through which refuse of digestion is commonly excreted. In the following, whenever referring to anal, the referral is to a feature, device, method, or system pertaining to the anus, e.g. pertaining to engagement with or through the anus. In the following, whenever referring to the rectal walls, the referral is to the intestinal wall surrounding and defining the canal of the rectum.

In the following, pressures are given in psi (pounds per square inch), where 1 psi=$7 \times 10^1$ mbar=7 kPa, and 1.0 psi=69 mbar=6.9 kPa, and 1.00 psi=68.9 mbar=68.9 kPa, and 1.000 psi=68.95 mbar=6.895 kPa.

The present disclosure provides a bowel irrigation system capable of controlling the size of an inflated balloon during a bowel irrigation procedure, and a method for controlling the size of an inflatable balloon of such a bowel irrigation system.

In a first aspect of the invention, the bowel irrigation system comprises a container adapted for containing a liquid, a catheter, a tubing connecting the container and the catheter, a pump, and a control unit. The catheter is adapted for insertion into a rectum of a user, and comprises a balloon inflated by an amount of liquid for retaining the catheter inside the rectum. The pump is adapted for inflating the balloon by an amount of liquid, and for pumping liquid from the container to the rectum through the catheter to irrigate the bowels. The control unit is adapted for controlling a flow of fluid in the system. The system further comprises a pressure sensor adapted for assessing a pressure inside the balloon. The system is adapted for at least partly deflating the balloon, as a response to an assessment of a first pressure inside the balloon being greater than a first threshold value, by reducing the amount of liquid inside the balloon by a first amount of liquid.

The system provides a more controllable system, as the system uses liquid for the inflation/deflation of the balloon. Liquid is an incompressible fluid, and therefore the volume of the balloon is proportional to the volume of liquid. Moreover, overpressure inside the balloon due to compression is avoided, thus the risk for rupture of the balloon is minimized.

A bowel irrigation system is typically operated by the user themselves without the need of medical training or assistance by medical professionals. The irrigation is typically carried out in the user's own home and does not require a medical environment, such as a hospital. The irrigation may also be carried out as a fee-for-service in a commercial environment, which again does not require medical staff or a particular medical environment. The irrigation procedure is a relatively minor intervention, as compared to surgical or other procedures carried out by medical professional, and entails no substantial health risks, when carried out by the user themselves with the required care and skill.

In the following, whenever referring to "inflation" or "deflation", the terms are related to inflation/deflation by a liquid, respectively. In the following, by inflation in meant the procedure of pumping liquid into a balloon, whereas by deflation is meant the procedure of withdrawing liquid from a balloon. Thus, deflation can be considered the opposite of/the counterpart to inflation, and vice versa.

In embodiments, the container can be any container suitable for containing a liquid. In embodiments, the container can be considered a reservoir. In embodiments, the container is capable of storing at least the amount of liquid required for a bowel irrigation procedure or at least the amount of liquid required for an irrigation procedure and the amount of liquid required for inflating the balloon of the catheter as described below. In embodiments, the liquid is water, such as tap water or a saline solution. In embodiments, the liquid is an irrigation liquid for irrigating the bowels. In embodiments, the irrigation liquid is used to inflate the balloon as well. As such, the liquid can be referred to both an irrigation liquid and an inflation liquid, depending on the situation or use. In the following, irrigation liquid or inflation liquid is used to highlight the specific use of the liquid, but it should be understood that the irrigation liquid and the inflation liquid can be the same substance/material. In an embodiment, the container can comprise separate compartments; one for a required amount of irrigation liquid, and one for a required amount of inflation liquid.

In embodiments, the catheter is adapted for insertion into the rectum of the user. In embodiments, the catheter is inserted into the rectum of the user. One useful exemplary catheter comprises a main tubular part, typically called a shaft, extending from the distal end to the proximal end. A tip is positioned in the proximal end of the catheter and is provided as a rounded closed end of the shaft. In embodiments, the catheter comprises a connector in the distal end and may in an embodiment comprise a flared end of the catheter so that the diameter of the connector increases with respect to the tubular part. In particular, a proximal end of the catheter is configured for insertion into the rectum of the user. In embodiments, the catheter is 8-16 mm in external diameter, for example 10 mm. The length of the catheter can be 70-200 mm, for example 150 mm. In embodiments, the catheter is of a size reflecting the needs or requirements of the user. As such, a range of different catheter sizes can be provided. In particular, catheter sizes denominated small and regular are used throughout the present disclosure. A small catheter has a smaller diameter than a regular catheter. For example, a small catheter can be suited for children, whereas a regular catheter can be suited for adults.

In embodiments the catheter is provided with eyelets in the proximal end, the eyelets communicating with an irrigation channel inside the catheter, so that irrigation liquid pumped into the catheter in a distal end can exit the catheter through the eyelets in the proximal end. Tests have shown that a diameter of the irrigation channel of approximately 3-7 mm, for example 4.3 mm, allows an adequate flow. The catheter is provided with an inflatable balloon for retaining the catheter inside the rectum during the irrigation procedure. In embodiments, the inflated balloon is suitable for sealing the anus, such that irrigation liquid cannot escape the rectum. In embodiments, the balloon extends radially around the catheter. In embodiments, the inflated balloon resembles a torus encircling the catheter. The balloon can be considered expandable. In embodiments, the balloon is provided near the proximal end of the catheter. By extending radially around the catheter, the inflated balloon hinders the irrigation liquid from escaping the rectum through the anus (during the irrigation procedure). For the purpose of inflating and/or deflating the balloon, the catheter is provided with an inflation channel extending from the distal end of the catheter and terminating under the balloon, i.e. in the interior of the balloon. An adequate diameter of the inflation channel is approximately 1-4 mm, such as 2 mm. In an embodiment, the balloon is inflated by an amount of liquid, in particular with liquid contained in the container. The balloon is inflated once the catheter is inserted in the rectum, and prior to pumping irrigation liquid into the rectum for stimulating the bowels of the user. The balloon is made of an elastic/flexible material. In embodiments, the balloon is made of a thermoplastic elastomer. Thereby, the balloon can expand and adapt to the internal shapes of the rectum, and thereby temporarily fixate the catheter in the rectum during the irrigation procedure.

In embodiments the balloon is inflatable/inflated by a nominal volume depending on the size of the catheter used (e.g. small and regular). In embodiments, the amount of liquid in the balloon is the nominal volume of liquid. By nominal is meant that the quantity (here, volume) is set by the system, and that the pump and/or other mechanisms of the system is adapted for complying with such nominal value. Thus, the nominal value is the value intended by the system. The volume of liquid in the balloon is related to its diameter, and as such reflects the needs and physical requirements of the user. In embodiments, for a regular size catheter, the balloon can be inflated by a nominal volume of 20 ml, 40 ml, 60 ml, 100 ml, or 160 ml. In embodiments, for a small catheter, the balloon can be inflated by a nominal volume of 12 ml, 26 ml, 40 ml, 60 ml, or 80 ml. A health care professional can assist the user in determining the optimal nominal volume, and as such the resulting size of the balloon. In embodiments, the nominal volumes are pre-determined and stored in a memory of the control unit. By specifying pre-determined volumes, the selection of an appropriate volume by a user is simplified.

Table 1 summarizes exemplary sizes of the inflatable balloon (0 (zero)-XL as selectable by the user) and the corresponding nominal volumes and diameters for a regular size catheter and a small size catheter. The indicated diameters are obtained in an experimental procedure of measuring the diameter following inflating the balloon by the indicated nominal volume. Thus, an uncertainty is attached to the diameters. Thus, the diameters should not be considered limiting for the invention. The diameter (10 mm) of the small and regular catheter for balloon size 0 (zero) reflects the basic diameter of the chosen catheter when the balloon is not inflated.

TABLE 1

| Balloon | Regular | | Small | |
| --- | --- | --- | --- | --- |
| size | Volume [ml] | Diameter [mm] | Volume [ml] | Diameter [mm] |
| 0 | 0 | 10 | 0 | 10 |
| XS | 20 | 26.5 | 12 | 23.6 |
| S | 40 | 37.6 | 26 | 34.6 |
| M | 60 | 45.1 | 40 | 42.1 |
| L | 100 | 54.2 | 60 | 49.5 |
| XL | 160 | 62.3 | 80 | 54.9 |

In embodiments the provision of a tubing connecting the container and the catheter allows for transfer of liquid from the container to selectably the balloon and the rectum, i.e. to the eyelets in the proximal end of the catheter and therefrom into the rectum once inserted. In embodiments, the tubing comprises a first and a second lumen, the first lumen connecting the interior of the balloon and the container, and the second lumen connecting the tip of the catheter and the container. In embodiments, the tubing is flexible. In embodiments, the tubing is transparent for providing visual assessment of the flow of fluid, i.e. both liquid and air, such as air arising from a rinsing procedure, where air is intentionally drawn into the tubing to avoid stagnant water.

In embodiments, a pump, such as an electrical pump, allows for the flow of fluid in the tubing, e.g. liquid intended for the inflation/deflation of the balloon and bowel irrigation, and air arising from a rinsing procedure. In embodiments, the pump is adapted for inflating the balloon by an amount of liquid, i.e. the pump is adapted for pumping (inflation) liquid from the container to the balloon. In embodiments, the pump is adapted for inflating and deflating the balloon. The amount of liquid can be as specified in table 1 above. In embodiments, the pump is adapted for pumping (irrigation) liquid from the container to the rectum through the catheter to irrigate the bowels. A system or ability for switching the pumping between pumping (irrigation) liquid into the rectum and inflating the retention means/balloon can be included in the bowel irrigation system. In embodiments, two pumps are provided; one for pumping irrigation liquid into the rectum, and one for inflating the balloon of the catheter. The pump(s) can be battery powered, such that the irrigation system is transportable and independent on provision of a power grid. The pump can be a gear pump or a centrifugal pump. In embodiments, the pump is a reversible electrical pump. In embodiments, the pump is able to pump air through the system in order to empty the tubing from liquid.

In embodiments, the control unit is adapted for controlling the flow of fluid generated by the pump. For example, the control unit is provided at an appropriate position along the tubing. In embodiments, the bowel irrigation system is provided with a processor, such as in the control unit. In embodiments, the bowel irrigation system is provided with a memory, such as in the control unit. In embodiments, the control unit communicates with the interior of the tubing, such that the control unit can assess the fluid flowing within the lumens of the tubing. In embodiments, an electrical wiring is provided within and/or along the tubing for allowing an electrical connection between the pump and the control unit, such that the control unit can be used to control the performance of the pump and/or other parts of the irrigation system. In embodiments, an electrical wiring is provided between the catheter and the control unit, thereby providing electrical communication therebetween. In embodiments, the control unit and the pump are in communication through a wireless protocol. In embodiments, the control unit comprises a user interface for receiving inputs from the user, and a graphical user interface for presenting information to the user. In embodiments, the control unit comprises means for alerting the user, e.g. through haptic feedback, sound, or light. In embodiments, the control unit is capable of receiving one or more inputs, analyzing the one or more inputs, and generating one or more responses/outputs based on the analysis.

In embodiments, the system further comprises a pressure sensor adapted for assessing a pressure inside the balloon. In embodiments, assessing the pressure involves reading the pressure sensor and obtaining a numerical value. In embodiments, the pressure sensor is read by means of the processor. In embodiments, the assessed pressure is indicative of the pressure inside the balloon. The pressure sensor can be arranged at any point in fluid communication with the interior of the balloon. In embodiments, the pressure sensor is arranged within the balloon, for example by being an integral part of the catheter. In an embodiment, the pressure sensor is arranged in the control unit. In embodiments, the pressure sensor is in fluid communication with the interior of the balloon through the first lumen. Thereby, the pressure can be assessed inside the first lumen connecting the interior of the balloon and the container. Due to the first lumen being in fluid communication with the interior of the balloon, the assessed pressure by the control unit is indicative of the pressure inside the balloon. Assessing the pressure by the control unit, and as such omitting a pressure sensor from the catheter, allows for an easier fabrication of catheters and/or for a simpler catheter construction. In embodiments, the control unit is adapted for assessing/reading the pressure sensor, such that the control unit can store and/or analyze the assessments/readings from the pressure sensor. Alternatively or additionally, the/a pressure sensor can be arranged where the tubing connects the pump, i.e. by/in the container in embodiments where the pump is arranged in the container. In embodiments, a second pressure sensor is in fluid communication with the irrigation channel of the catheter, such that the second pressure sensor can assess the pressure in the irrigation channel, indicative of a bowel pressure. Thereby, the pressure in the bowels can be assessed and analyzed.

According to the first aspect of the invention, the system is adapted for at least partly deflating the balloon, as a response to the assessment of a first pressure inside the balloon being greater than a first threshold value, by reducing the amount of liquid inside the balloon by a first amount of liquid. In other words, the system is adapted for at least partly deflating the balloon by a first amount of liquid as a response to the assessment of a first pressure inside the balloon being greater than a first threshold value. Thus, deflation of the balloon is conditional on the pressure as assessed and the outcome of the comparison of the assessed pressure with the first threshold value. In embodiments, the system is adapted for at least partly deflating the balloon, as a response to a first pressure inside the balloon being greater than a first threshold value, by reduced the amount of liquid inside the balloon by a first amount of liquid. Thus, the system is adapted to deflate the balloon from a fully inflated state (i.e. from an amount of liquid (nominal volume) reflecting the needs of the user) to a state wherein the balloon contains less volume than the nominal volume. In embodiments, the first amount of liquid is less than the amount of liquid in the balloon. In embodiments, the system is adapted for inflating the balloon by a nominal volume prior to assessing the pressure inside the balloon.

During an irrigation procedure, the catheter is retained inside the rectum by means of the inflated balloon, i.e. the inflated balloon is considered a retention means for retaining the catheter inside the rectum. During the irrigation procedure, autonomous peristaltic movements may exert a pressure on the inflated balloon. However, due to the incompressible nature of liquid contained in the inflated balloon, such exerted pressure can cause the balloon to exert a counter pressure onto the rectal walls. Such counter pressure can pose a risk or cause damage to the rectal walls, especially for users having sensitive or fragile rectal walls due to surgery. In addition, an increased pressure inside the balloon can increase the risk of bursting the balloon. The ability of the first aspect of the system to deflate the balloon by a first amount of liquid at least partly remedies such consequences. In particular, since the deflation of the balloon by a first amount of liquid in turn reduces the size of the balloon, the balloon is less likely to exert an alarming counter pressure on the rectal walls and/or induce a high bowel pressure. The pressure inside the balloon is indicative of such peristaltic movements or other factors giving rise to a pressure increase, as the pressure inside the balloon will increase in response to an external pressure exerted on the incompressible balloon.

Different contributions to the pressure inside the balloon can arise during use of the bowel irrigation system/during a bowel irrigation procedure. In embodiments, the pressure inside the balloon deviates from the pressure associated with fluids in the rectum/bowel, i.e. the bowel pressure. Regulatory limitations can be employed to the bowel pressure. Displacing fluids in the rectum by means of an inflatable balloon can cause an increase of the bowel pressure. However, through a bowel irrigation system as disclosed, means for complying with such regulatory limitations/requirements are provided. In embodiments, the first threshold value relates to the pressure inside the balloon, rather than the pressure exerted on the rectal walls and/or the bowel pressure. In particular, the presence of the elastic material constituting part of the balloon increases the pressure inside the balloon, without contributing to the pressure exerted on the rectal walls or the bowel pressure. Likewise, the pressure inside the balloon can receive contributions from a hydrostatic pressure not affecting the pressure exerted on the rectal walls or the bowel pressure. Thus, in embodiments, when discussing the first threshold value, the pressure relates to the pressure inside the balloon, rather than the pressure exerted on the rectal walls or the bowel pressure.

In embodiments, the assessment of a pressure inside the balloon being greater than a first threshold value triggers the system to deflate the balloon by a first amount of liquid. In embodiments, the first threshold value and the first amount of liquid are pre-determined/-defined and stored in the system. In embodiments, the first amount of liquid is less than the amount of liquid in the balloon once the latter has been inflated as part of an initial step of the irrigation procedure. A deflation decreases the size of the balloon, in particular its diameter. As such, the pressure exerted on the rectal walls by the balloon is decreased. In embodiments, the system is capable of adapting the size of the balloon to the peristaltic movements of the bowel, in a way to avoid exerting a potentially damaging pressure to the rectal walls.

In embodiments, the first amount of liquid can be nominally 5 ml, 10 ml, 15 ml, 20 ml, 25 ml, 30 ml, 35 ml, 40 ml, 45 ml, or 50 ml. In embodiments, the first amount of liquid depends on the initial size (nominal volume) of the balloon. In an embodiment, the first amount of liquid is nominally 20 ml. In embodiments, 20 ml is a preferred first amount of liquid across all nominal volumes/sizes of the balloon, as such amount reduces the size sufficiently for all sizes included in the deflation scheme.

In embodiments, the first threshold value depends on the size/nominal volume of the inflated balloon. For example, a small size balloon, i.e. a balloon containing a small nominal volume, can have a higher threshold value because of its small size in the first place. Likewise, a large size balloon can have a lower threshold value, as the potential counter pressure is exerted on a larger surface area, and as such may potentially damage larger areas. In addition, the higher threshold value for a small size balloon can reflect that the material of such small size balloon is tenser. In embodiments, the first threshold value for a regular size catheter comprising a balloon inflated by a nominal volume of 60 ml is 7 psi ($5\times10^2$ mbar), or 7.0 psi ($4.8\times10^2$ mbar), or 7.00 psi (483 mbar). In embodiments, the first threshold value for a regular size catheter comprising a balloon inflated by a nominal volume of 100 ml is 5 psi ($3\times10^2$ mbar), or 5.0 psi ($3.4\times10^2$ mbar), or 5.00 psi=345 mbar. In embodiments, the first threshold value for a regular size catheter comprising a balloon inflated by a nominal volume of 160 ml is 4 psi ($3\times10^2$ mbar), or 4.0 psi ($2.8\times10^2$ mbar), or 4.00 psi (276 mbar). In embodiments, the system does not deflate the balloon when a regular size catheter comprises a balloon inflated by less than 60 ml. In embodiments, the first threshold value for a small size catheter comprising a balloon inflated by a nominal volume of 40 ml is 10 psi ($6.9\times10^2$ mbar), or 10.0 psi (689 mbar). In embodiments, the first threshold value for a small size catheter comprising a balloon inflated by a nominal volume of 60 ml is 7 psi ($5\times10^2$ mbar), or 7.0 psi ($4.8\times10^2$ mbar), or 7.00 psi (483 mbar). In embodiments, the first threshold value for a small size catheter comprising a balloon inflated by a nominal volume of 80 ml is 6 psi ($4\times10^2$ mbar), or 6.0 psi ($4.1\times10^2$ mbar), or 6.00 psi (414 mbar). In embodiments, the system does not deflate the balloon when a small size catheter comprises a balloon inflated by less than 40 ml.

In an embodiment, the system further comprises a valve adapted for controlling the amount of liquid in the balloon. The valve can be arranged at any point along the first lumen connecting the container and the interior of the balloon. In embodiments, the valve is arranged by the pump, or by the control unit, or by the catheter. In embodiments, the valve can take any position between a fully open state and a fully closed state, where the former can allow for unhindered passage of liquid, and the latter can fully hinder passage of liquid. The open state can be associated with the deflation of the balloon, and the closed state can be associated with the preservation of pressure in the balloon. Thus, by opening the valve, the balloon can be deflated given a differential pressure drives the deflation. Hence, collapsing/deflation of the balloon can be accurately controlled by adequate control of the valve and management of a differential pressure. In embodiments, the volume drained from the balloon is assessed by the control unit.

In an embodiment, the pump is adapted for controlling the amount of liquid in the balloon. In embodiments, the pump is a reversible electrical pump, which is operable in one direction to pump liquid into the balloon through the first lumen of the tubing, and which is operable in a reverse direction to withdraw liquid from the balloon through the first lumen for deflation thereof in response to either user input or system input, e.g. due to a pressure reading prompting such deflation. In other words, the balloon can be deflated by reversing the direction of flow in the first lumen, such that the pump drains the balloon. The primary direction of flow can be considered the direction in which the pump pumps liquid from the container to the catheter/balloon. Consequently, reversing the direction of flow results in liquid being pumped from the balloon towards the container. Hence, inflation of the balloon as well as collapsing/deflation thereof can be accurately controlled by adequate control of the pump.

In an embodiment, the control unit comprises a processor having processing capabilities for determining a need for deflation. The processing capabilities include obtaining the assessed first pressure from the pressure sensor, comparing the first pressure with the first threshold value, and determining an output based on the comparison. In embodiments, obtaining the assessed first pressure from the pressure sensor includes assessing the pressure sensor and obtaining a numerical value indicative of the pressure inside the balloon at a certain point in time. In embodiments, comparison of the first pressure with the first threshold value includes comparing the numerical value of the first pressure with a numerical value of the first threshold value.

In embodiments, the system, such as the control unit, comprises a processor for handling inputs and process information in order to generate outputs, e.g. outputs directed the pump or the valve. In embodiments, an output is an instruction to be applied to the pump and/or to the valve in order to either inflate or deflate the balloon. In embodiments, the control unit comprises processing capabilities through the provision of the processor. In embodiments, a memory is included in the control unit for storing the inputs and/or outputs. Based on the generated output, the control unit can instruct the valve to open or close, or instruct the pump to inflate or deflate the balloon, or make the valve and pump cooperate to provide an inflation or deflation of the balloon. For example, a first output is generated if the assessed pressure is above the first threshold value, whereas a second output is generated if the assessed pressure is below the first threshold value. In embodiments, the first output includes an instruction to open the valve or reversing the pump direction, such actions being associated with a deflation in an embodiment. Likewise, in embodiments the second output includes an instruction to keep the valve closed or the pump in a paused state, such actions being association with a retention of the volume in the balloon in an embodiment.

In embodiments, the system, following a deflation, is adapted for inflating the balloon by a second amount of liquid as a response to the assessment of a second pressure in the balloon being below a second threshold value. Following a deflation, effectuated by the assessment of a pressure being above the first threshold value, the size of the balloon decreases. This in turn reduces the pressure inside the balloon. Deflation can be due to peristaltic movements inside the rectum exerting a pressure on the balloon. However, such peristaltic movements can reduce/vanish after time, in turn leaving the balloon with an inadequate size/diameter due to lack of ample liquid. Thus, a need exists to increase the size of the balloon following a deflation, if the balloon, following a deflation, is of inadequate size. Therefore, in embodiments, the system is adapted for reassessing the pressure inside the balloon and based on a comparison with a pre-determined second threshold value, generate an output instructing the system, such as the pump, to reinflate the balloon by a second amount of liquid. Thereby, the balloon regains an adequate size reflecting the pressure exerted on the balloon. In embodiments, reinflation is executed if the pressure inside the balloon is below the second threshold value, as this indicates the pressure inside the balloon being inadequate.

In an embodiment, the first amount of liquid is greater than the second amount of liquid. For example, the second amount of liquid can be nominally 3 ml less than the first amount of liquid. For example, if the first amount of liquid is nominally 20 ml, the second amount of liquid can be nominally 17 ml. In an embodiment, the second amount of liquid is nominally 17 ml. Thereby, the risk of reinflating the balloon by an amount of liquid exceeding the amount by which the balloon was previously deflated is minimized. Thereby, it is ensured the balloon is never inflated to a size larger than what was originally intended.

Table 2 summarizes exemplary nominal volumes of the inflatable balloon along with first and second threshold values of the pressure determining the need for deflation and/or reinflation and the corresponding first and second amount of liquids ("deflation" and "reinflation", respectively). In embodiments, for small balloon sizes (O, XS, and S), deflation due to a high pressure inside the balloon is deactivated, as deflating the balloon by a first amount of liquid, e.g. 20 ml, greatly affects the overall retaining properties of the balloon. Likewise, a counter pressure is less likely to pose a risk for small balloon sizes. Thus, the above described auto-deflation scheme, as summarized in Table 2, can be deactivated for certain balloon sizes.

TABLE 2

| Catheter size | Balloon size | Nominal volume [ml] | P1: first threshold value for deflation [psi] | P2: second threshold value for reinflation [psi] | Deflation [ml] | Reinflation [ml] |
|---|---|---|---|---|---|---|
| Regular | O | 0 | No auto deflation | | | |
| | XS | 20 | | | | |
| | S | 40 | | | | |
| | M | 60 | 7 | 3.5 | 20 | 17 |
| | L | 100 | 5 | 3.5 | 20 | 17 |
| | XL | 160 | 4 | 3.5 | 20 | 17 |
| Small | O | 0 | No auto deflation | | | |
| | XS | 12 | | | | |
| | S | 26 | | | | |
| | M | 40 | 10 | 3.5 | 20 | 17 |
| | L | 60 | 7 | 3.5 | 20 | 17 |
| | XL | 80 | 6 | 3.5 | 20 | 17 |

For the pressures given in psi in the table above (Table 2), the equivalents in mbar are 3.5 psi=$2.4\times10^2$ mbar, 4 psi=$3\times10^2$ mbar, 5 psi=$3\times10^2$ mbar, 6 psi=$4\times10^2$ mbar, 7 psi=$5\times10^2$ mbar, and 10 psi=$6.9\times10^2$ mbar. In embodiments, the threshold values are given with two or more significant digits, such as two or three significant digits, where the equivalents in mbar for 4/4.0/4.00 psi, 5/5.0/5.00 psi, 6/6.0/6.00 psi, 7/7.0/7.00 psi, and 10/10.0 psi are as previously disclosed, and where 3.50 psi=241 mbar.

The use of the terms "first" and "second" pressure/threshold value/amount of liquid, does not imply any order of importance, but are included to identify and distinguish individual measures. In particular, the reference to a "first" pressure is meant to describe that the pressure inside the balloon varies by time, and that the "first" pressure thereby is a certain pressure at a certain point in time. The same applies to the "second" pressure where applicable. The "second" pressure may be assessed following the assessment of a first pressure, thereby indicating a temporal relationship between the first and second pressures. The reference to a "first" and "second" threshold value/amount of liquid are used to relate the first and second pressures to such relevant measures. For example, the first threshold value is related to the assessment of a first pressure, as said first pressure is compared to the first threshold value according to an embodiment. Likewise, the second threshold value is related to the assessment of a second pressure, as said second pressure is compared to the second threshold value according to an embodiment. The same reasoning applies to the amount of liquid; the first amount of liquid is related to a response generated by the comparison of the first pressure to the first threshold value according to an embodiment, and the second amount of liquid is related to a response generated by the comparison of the second pressure to the second threshold value according to an embodiment. Reference to a third, fourth, fifth, etc., are foreseen, and the reasoning above applies to such naming. The system may assess a first and a second pressure consecutively and/or repeatedly. For example, the consecutive assessment of a first and a second pressure allows for analyzing the temporal development of the pressure between the assessment of the first pressure and the assessment of the second pressure.

In a second aspect of the invention, a method for controlling the size of an inflatable balloon of a catheter for a bowel irrigation system is disclosed. The bowel irrigation system comprises the above disclosed features; a container adapted for containing a liquid, a catheter adapted for insertion into a rectum of a user, the catheter comprising an inflatable balloon for retaining the catheter inside the rectum, a tubing connecting the container and the catheter, a pump adapted for inflating the balloon by an amount of liquid, and for pumping liquid from the container to the rectum through the catheter to irrigate the bowels, and a control unit adapted for controlling a flow of fluid in the system. Further, the system comprises a pressure sensor adapted for assessing a pressure inside the balloon. The method comprises the steps of providing a liquid in the container and of inflating the balloon by an amount of liquid by pumping liquid from the container to the balloon through the tubing by means of the pump. Further, the method comprises the additional steps of (i) assessing a first pressure inside the balloon by means of the pressure sensor, (ii) comparing the first pressure with a first threshold value, and (iii) deflating the balloon by reducing the amount of liquid inside the balloon by a first amount of liquid, if the first pressure is above the first threshold value. Thus, the means for executing the method include the above disclosed bowel irrigation system. The amount of liquid to be introduced into the balloon depends on the desired size of the balloon as specified in table 1 above. In embodiments, the method comprises the initial step of inserting the catheter into a rectum of a user prior to inflating the balloon. In embodiments, the system is prepared by providing ample liquid in the container, ample liquid being of an amount sufficient for at least providing enough liquid to reach the nominal (specified) volume of the balloon, or for at least providing enough liquid to reach the nominal volume and sufficient liquid for a subsequent bowel irrigation procedure.

A bowel irrigation system is typically operated by the user themselves without the need of medical training or assistance by medical professionals. The irrigation is typically carried out in the user's own home and does not require a medical environment, such as a hospital. The irrigation may also be carried out as a fee-for-service in a commercial environment, which again does not require medical staff or a particular medical environment. The irrigation procedure is a relatively minor intervention, as compared to surgical or other procedures carried out by medical professional, and entails no substantial health risks, when carried out by the user themselves with the required care and skill.

In embodiments, the first additional step of the method includes assessing the pressure inside the balloon by means of the pressure sensor and thereby obtain a numerical value indicative of the pressure inside the balloon. In embodiments, the control unit comprises means for assessing the pressure sensor, analyzing the assessment, and store all relevant data related to the assessment in a memory, e.g. the numerical value of the pressure, time, date, etc.

In embodiments, the control unit comprises a processor adapted for analyzing the pressure and comparing the assessed pressure with a pre-determined first threshold value, according to the second additional step of the method. The first threshold value can be stored in the control unit, and can be adaptable by an operator, or can be fixed by the manufacturer. The first threshold value serves to set the limit for the maximum pressure allowed inside the balloon and can depend on the size of the catheter and the balloon. The pressure inside the balloon is indicative of the pressure exerted on the rectal walls by the balloon and of the bowel pressure. As such, the first threshold value is selected to ensure the pressure exerted on the rectal walls can be considered safe and/or that the bowel pressure does not exceed regulatory requirements.

In embodiments, the third additional step of the method comprises, following a comparison of the first pressure with the first threshold value, the conditional step of deflating the balloon by a first amount of liquid, if the comparison establishes that the first pressure exceeds the first threshold value. In case the comparison does not establish that the first pressure exceeds the first threshold value, the condition of the third additional step of the method is not met, and the method can revert to the first additional step. Thus, the method can cycle through the steps, and only execute the third additional step, i.e. to deflate the balloon by a first amount of liquid, if the condition is met. Thus, in an embodiment of the method, the third additional step is conditional, and as such depends on the comparison of the first pressure with the first threshold value according to the second additional step. In embodiments, the additional steps of the method are cycled during the entire irrigation procedure in a way to continuously monitor the pressure inside the balloon and adapt accordingly.

In an embodiment, the pump deflates the balloon, e.g. by reversing the direction of the pump. In embodiments, the pump is an electrical pump, in particular a reversible electrical pump. Thus, the pump can drain the balloon by pumping liquid from the balloon to the container. In embodiments, the system is capable of controlling the pump by means of the control unit, in particular by means of the processor comprised in the control unit.

In embodiments, the bowel irrigation system comprises a valve for controlling the amount of liquid in the balloon, and where deflation of the balloon is carried out by adequate control of the valve. In embodiments, deflation of the balloon is carried out by means of the pump and the valve in cooperation. By including a valve in the system, the balloon can be deflated by controlling said valve and a differential pressure between the pressure in the balloon and the surroundings. In embodiments, the system is capable of manipulating the state of the valve by means of the control unit, in particular by means of a processor comprised in the control unit. For example, the state can be open or closed, where an open state can allow liquid to escape the balloon, causing a deflation. Consequently, a closed state can correspond the situation where the balloon maintains its pressure and, as such, its size. In embodiments, by opening the valve, the pressure inside the balloon, in particular a differential pressure between the pressure inside the balloon and the surroundings, causes the balloon to drain until the valve is closed.

In an embodiment, the bowel irrigation system comprises a processor having processing capabilities for determining a need for deflation, the processing capabilities including obtaining the assessed first pressure from the pressure sensor, comparing the first pressure with the first threshold value, and determining an output based on the comparison.

In embodiments, obtaining the assessed first pressure from the pressure sensor includes assessing the pressure sensor and obtaining a numerical value indicative of the pressure inside the balloon at a certain point in time. In embodiments, comparison of the first pressure with the first threshold value includes comparing the numerical value of the first pressure with a numerical value of the first threshold value. Thus, in embodiments, the method comprises the steps of obtaining the assessed first pressure from the pressure sensor, comparing the first pressure with the first threshold value, and determining an output based on the comparison. In embodiments, the system, such as the control unit, comprises a processor for handling inputs and process information in order to generate outputs, e.g. outputs directed the pump or the valve. In embodiments, an output is an instruction to be applied the pump and/or the valve in order to either inflate or deflate the balloon. In embodiments, the control unit comprises processing capabilities through the provision of the processor. In embodiments, a memory is included in the control unit for storing the inputs and/or outputs. Based on the generated output, the control unit can instruct the valve to open or close, or instruct the pump to inflate or deflate the balloon, or make the valve and pump cooperate to provide an inflation or deflation of the balloon. For example, a first output is generated if the assessed pressure is above the first threshold value, whereas a second output is generated if the assessed pressure is below the first threshold value. In embodiments, the first output includes an instruction to open the valve or reversing the pump direction, if such actions deflate the balloon. Likewise, in embodiments the second output includes an instruction to keep the valve closed or the pump in a paused state, if such actions retain the volume in the balloon.

In an embodiment, the method comprises the further additional steps of (a) assessing a second pressure inside the balloon following a deflation, (b) comparing the second pressure with a second threshold value, and (c) inflating the balloon by a second amount of liquid if the second pressure is below the second threshold value. Thus, the further additional steps are conditional on the preceding steps of deflating the balloon. In other words, the further additional steps are conditional on a foregoing deflation procedure. Thus, in embodiments, following a possible deflation by a first amount of liquid, the method proceeds to monitor the pressure inside the balloon and compare the pressure with the second threshold value, and execute the reinflation by a second amount of liquid if the pressure falls below the second threshold value.

Following a deflation, effectuated by the assessment of a pressure being above the first threshold value, the size of the balloon decreases. This in turn reduces the pressure inside the balloon.

Deflation can be a response to peristaltic movements inside the rectum exerting a pressure on the balloon. However, such peristaltic movements can reduce/vanish over time, in turn leaving the balloon with an inadequate size/diameter due to lack of ample liquid. Thus, a need exists to increase the size of the balloon following a deflation, if the balloon following a deflation is of inadequate size. Therefore, in embodiments, the method comprises the further additional steps of monitoring the pressure inside the balloon following a deflation procedure and based on a comparison with a pre-determined second threshold value, generate an output instructing the system, in particular the pump, to reinflate the balloon by a second amount of liquid. Thereby, the balloon regains an adequate size reflecting the pressure exerted on the balloon. Thus, in embodiments, reinflation is executed if the pressure inside the balloon is below the second threshold value, as this indicates the pressure inside the balloon being inadequate.

In embodiments, the pressure inside the balloon is compared simultaneously with the first threshold value and the second threshold value. Thereby, any of the above disclosed additional steps of the method can be employed at any time. For example, a need for an additional deflation can arise before a need for reinflation arises. As such, by comparing the assessed pressure inside the balloon with both the first threshold value and the second threshold value allows for determining an adequate output, e.g. to deflate the balloon further, because the pressure is still too high (exceeding the first threshold value) following a first deflation by a first amount of liquid. In other words, following a deflation by a first amount of liquid, additional peristaltic movements can cause the pressure inside the balloon to exceed the first threshold value before a potential reinflation as explained above, and as such require the method to include a second deflation, in order to decrease the size of the balloon even further. Thus, by comparing the pressure simultaneously is meant that the assessed pressure is compared to both the first threshold value and the second threshold value before determining an output.

In embodiments, the pressure is monitored by a sample rate selected between 10 Hz and 0.017 Hz, or between 1 Hz and 0.033 Hz, or between 1 Hz and 0.1 Hz. A high sample rate allows for near-continuous monitoring of the pressure, allowing the method to adapt the size of the balloon to changes promptly. A low sample rate allows for energy savings, a reduced risk of false readings, and constant adaption, which can be superfluous depending on the sensitivity of the system.

In an embodiment, the deflation and/or reinflation is executed based on an average pressure sampled over a predefined period of time. In embodiments, the predefined period of time is selected in order to ensure that the assessed pressure is stable and the risk of executing outputs based on false readings is reduced. For example, where the sample rate is high, the average of the assessed pressures within the predefined period of time is applied to the step of comparison with a first or a second threshold value. In embodiments, the average pressure is sampled over a period of less than 1 second, or over a period of 1 second, or 2 seconds, or 3 seconds, or 4 seconds, or 5 seconds, or 6 seconds, or 7 seconds, or 8 seconds, or 10 seconds, or over a period of more than 10 seconds.

DETAILED DESCRIPTION OF THE DRAWINGS

Figures 1A, 1B, 1C:
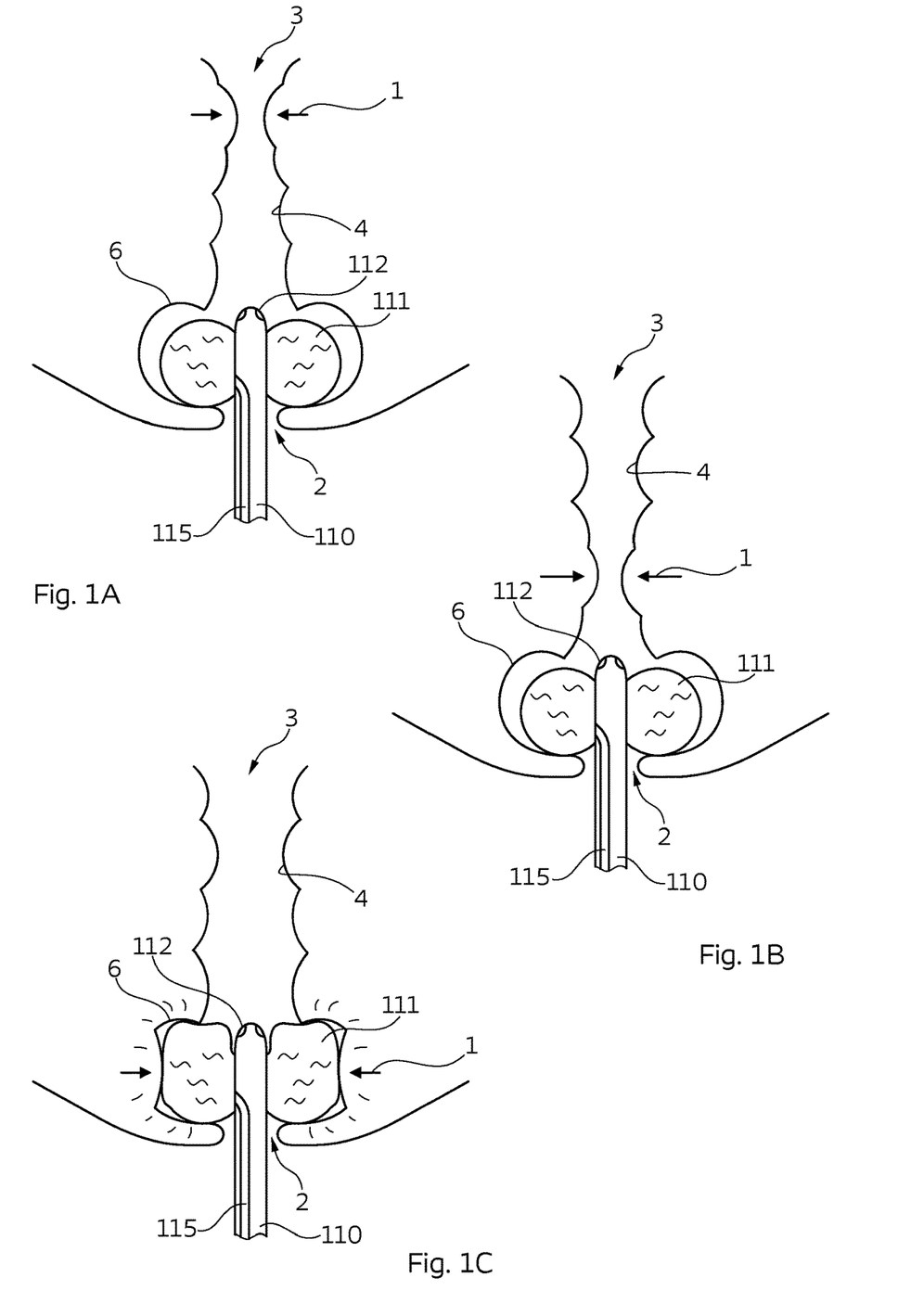
FIG. 1A illustrates a cross sectional view of a rectum of a user and a catheter of one embodiment of a bowel irrigation system.
FIG. 1B illustrates a cross sectional view of a rectum of a user and a catheter of one embodiment of a bowel irrigation system.
FIG. 1C illustrates a cross sectional view of a rectum of a user and a catheter of one embodiment of a bowel irrigation system.

FIG. 1A illustrates a schematic cross-sectional view of a rectum 3 of a user and a catheter 110 of a bowel irrigation system inserted herein through the anus 2. The catheter 110 as illustrated comprises an inflated balloon 111, inflatable through the inflation channel 115. The inflation channel 115 is in fluid communication with a container holding the liquid used for inflating the balloon 111. The inflated balloon 111 is considered a retention means for retaining the catheter 110 in a fixed position inside the rectum 3 and further serves blocking the anus 2 during the bowel irrigation procedure. The proximal end of the catheter 110 is provided with eyelets 112 communicating with an irrigation channel (not shown) inside the catheter 110, so that liquid pumped into the catheter 110 in its distal end can exit the catheter through the eyelets 112 at the proximal end and enter the rectum 3. The liquid can be held in a container in fluid communication with the irrigation channel. In the lower part of the rectum 3, a chamber 6 is naturally present, the chamber 6 allowing the inflatable balloon 111 to be inflated without pushing excessively on the rectal walls 4. Once the inflatable balloon 111 has been inflated inside the chamber 6, irrigation liquid can be pumped into the rectum 3 through the catheter 110 and further through the eyelets 112. During such procedure, and during the subsequent procedure of letting the irrigation liquid stimulate the bowels for a specified period of time, peristaltic movements can arise. For example, the specified period of time can be between 1 minute and 30 minutes, for example for 15 minutes. In this period, the catheter 110 is kept in place inside the rectum and the balloon 111 is kept inflated to prevent the irrigation liquid from escaping through the anus 2.

FIGS. 1A-1C illustrates a peristaltic movement 1. A peristaltic movement can be defined as a radially symmetric contraction and relaxation of muscles propagating a wave. The peristaltic movement 1 is shown as propagating towards the anus 2 in the series of figures. The peristaltic movement 1 causes the rectal walls 4 to contract, reducing the space between said walls 4. In case the inflated balloon 111 inside the rectum 3 is inflated by an incompressible fluid, e.g. a liquid, the peristaltic movement 1 can cause an increase of pressure inside the balloon 111, in turn causing a counter pressure on the rectal walls 4 (as shown in FIG. 1C). According to the disclosure, the inflated balloon 111 is able to adapt to peristaltic movements 1, such that the counter pressure exerted on the rectal walls 4 is reduced and/or such that the bowel pressure complies with regulatory limitations. In embodiments, the adaption is done through a deflation by a first amount of liquid in response to the assessment of an increased pressure inside the balloon. Thus, deflation is actuated by the pressure inside the balloon exceeding a first threshold value. The pressure is assessed by a pressure sensor in fluid communication with the interior of the balloon 111. The pressure sensor can for example be arranged in a control unit or inside the balloon 111. The deflation causes the balloon 111 to shrink in size, whereby the pressure inside said balloon 111 lowers, in turn reducing the pressure exerted on the rectal walls 4 or the bowel pressure. Cases can exist, where the pressure inside the balloon is not lowered by the deflation. Such cases can be due to the bowels adapting to the reduced size of the balloon, such that the pressure is constant, but the size is reduced. In such cases, the balloon can be deflated by a first amount of liquid once more. If the peristaltic movement 1 vanishes, the balloon 111 can be reinflated. Disappearance of the peristaltic movement 1 can for example be detected by the pressure inside the balloon dropping below a second threshold value. For example, the balloon 111 is deflated by a first amount of liquid and reinflated by a second amount of liquid, the first amount of liquid being greater than the second amount of liquid.

Figure 2A:
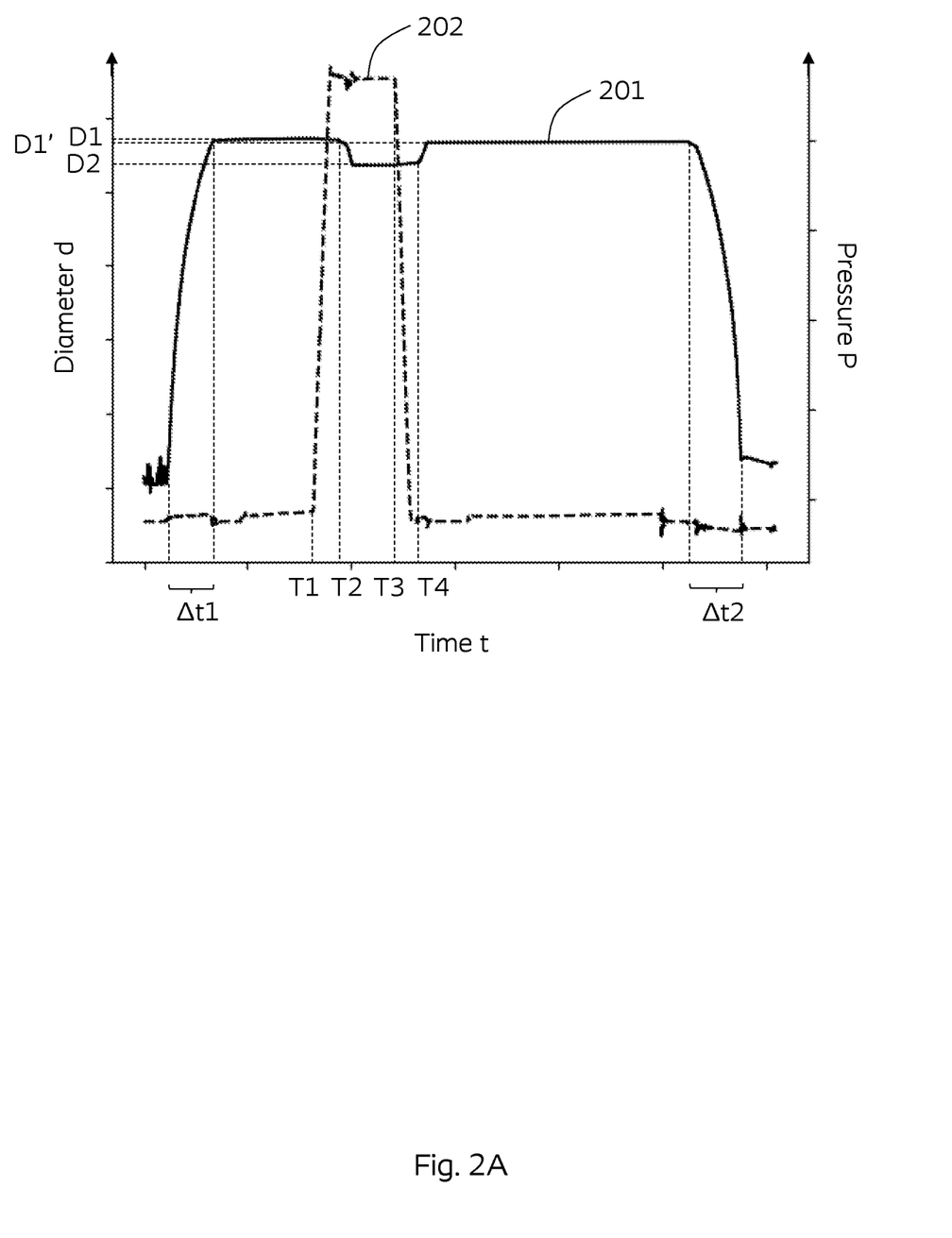
FIG. 2A illustrates a dataset depicting diameter of an inflated balloon of a catheter and external pressure as a function of time obtained in one embodiment of a method according to the disclosure.

FIG. 2A illustrates a first graph 201 (in solid line) depicting the diameter d of a balloon as a function of time t (d(t)), and a second graph 202 (in dashed line) depicting an external pressure P exerted on the balloon as a function of time t (P(t)), the time t being common for both graphs 201, 202. The data was obtained in an experimental study. The diameter of the balloon is a measure of its size, and dependent on the amount (volume) of liquid by which it is inflated. Where the shape of the balloon is toroidal/resembles a torus, as will be the case when the balloon encircles the catheter, the diameter d of the balloon can be the external diameter of such a torus.

Considering the first graph 201, the balloon is inflated during an inflation period Δt1. After the inflation period Δt1, the balloon has reached a desired first diameter D1. The desired diameter D1 can for example be maintained by closing a valve in the system, whereby the inflated liquid is not allowed to escape the balloon. At time T1, an external pressure P (second graph 202) is exerted on the balloon, in turn causing the pressure inside the balloon to increase. The external pressure can be caused by peristaltic movements. The pressure inside the balloon is monitored by a pressure sensor. The system is adapted for reacting to the increased pressure inside the balloon by deflating the balloon by a pre-determined first amount of liquid at time T2, causing the balloon to shrink in size to a second dimeter D2. The pre-determined first amount of liquid can be nominally 20 ml. The delay between T1 and T2 can reflect a period of time needed to assess a stable pressure inside the balloon and for the processor to determine an output. In embodiments, a period of three seconds is chosen, but a different shorter or longer period is foreseen. At time T3, the external pressure P is relieved, which is detected by the system by a drop in the pressure inside the balloon. In response to the relieved external pressure, the system reinflates the balloon by a pre-determined second amount of liquid at time T4. The second amount of liquid causes the size/diameter of the balloon to increase to a third diameter Dr. In a preferred embodiment, the third diameter D1' is smaller than the first diameter D1, i.e. D1'<D1, but greater than the second diameter, i.e. D2<D1'<D1. The difference in diameter is attained by the second amount of liquid being less than the first amount of liquid. For example, if the first amount of liquid is nominally 20 ml, the second amount of liquid can be nominally 17 ml. Thereby, inaccuracies in the system, in particular in the pump, are less likely to cause the balloon to attain a size greater than originally intended, namely the first diameter D1. Eventually, when the entire irrigation procedure is completed, the balloon is fully deflated (deflation period Δt2) and the catheter is removed from the rectum.

It is noted that the described automatic procedure of deflation by a first amount of liquid and subsequent reinflation by a second amount of liquid can be repeated as often as necessary. Eventually, due to the nominally lower volume of the second amount of liquid, the balloon is emptied, constituting a safety mechanism.

Figure 2B:
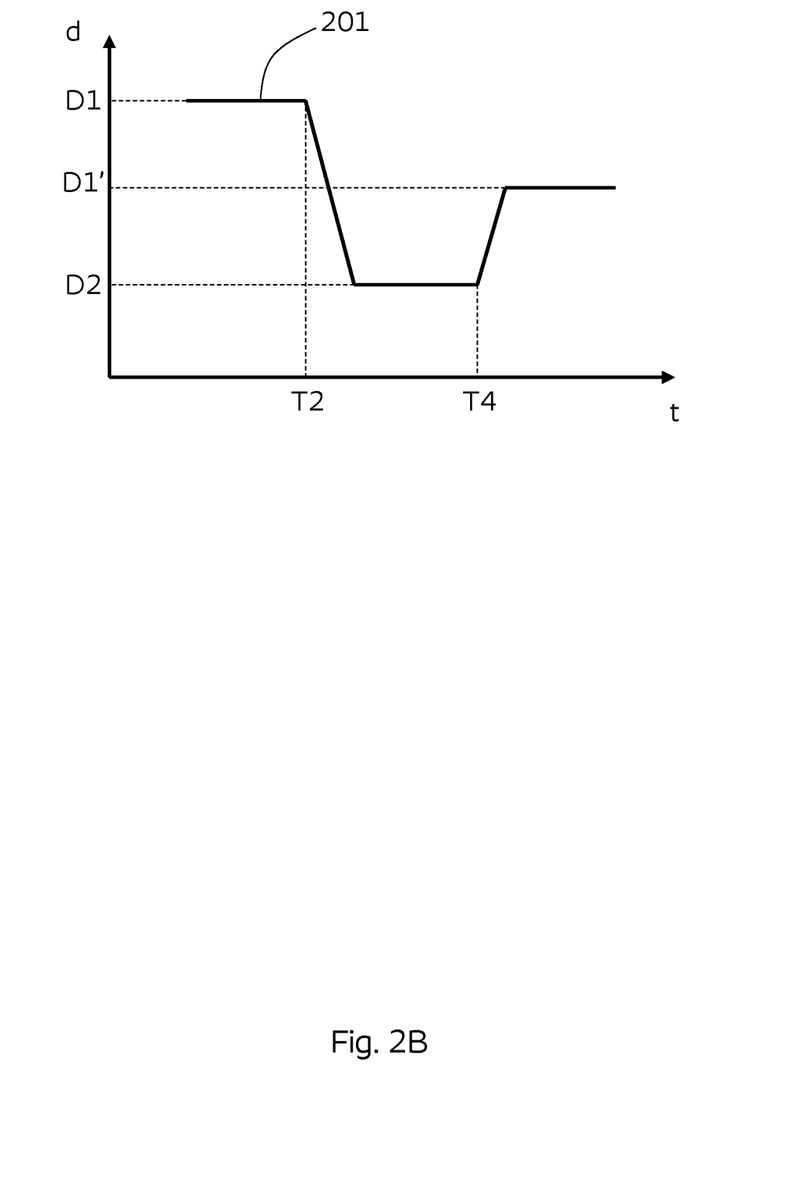
FIG. 2B illustrates a schematic section of the dataset depicting diameter of an inflated balloon of a catheter and external pressure as a function of time.

FIG. 2B illustrates a schematic section of the first graph 201 of FIG. 2A. Here, it is more explicitly illustrated, how the diameter d of the balloon is initially D1, but is reduced to D2 at time T2 by deflating the balloon by a first amount of liquid. At time T4 (external pressure is relieved), the balloon is reinflated by a second amount of liquid, in order to reach the diameter D1', where D1'<D1.

Figure 3:
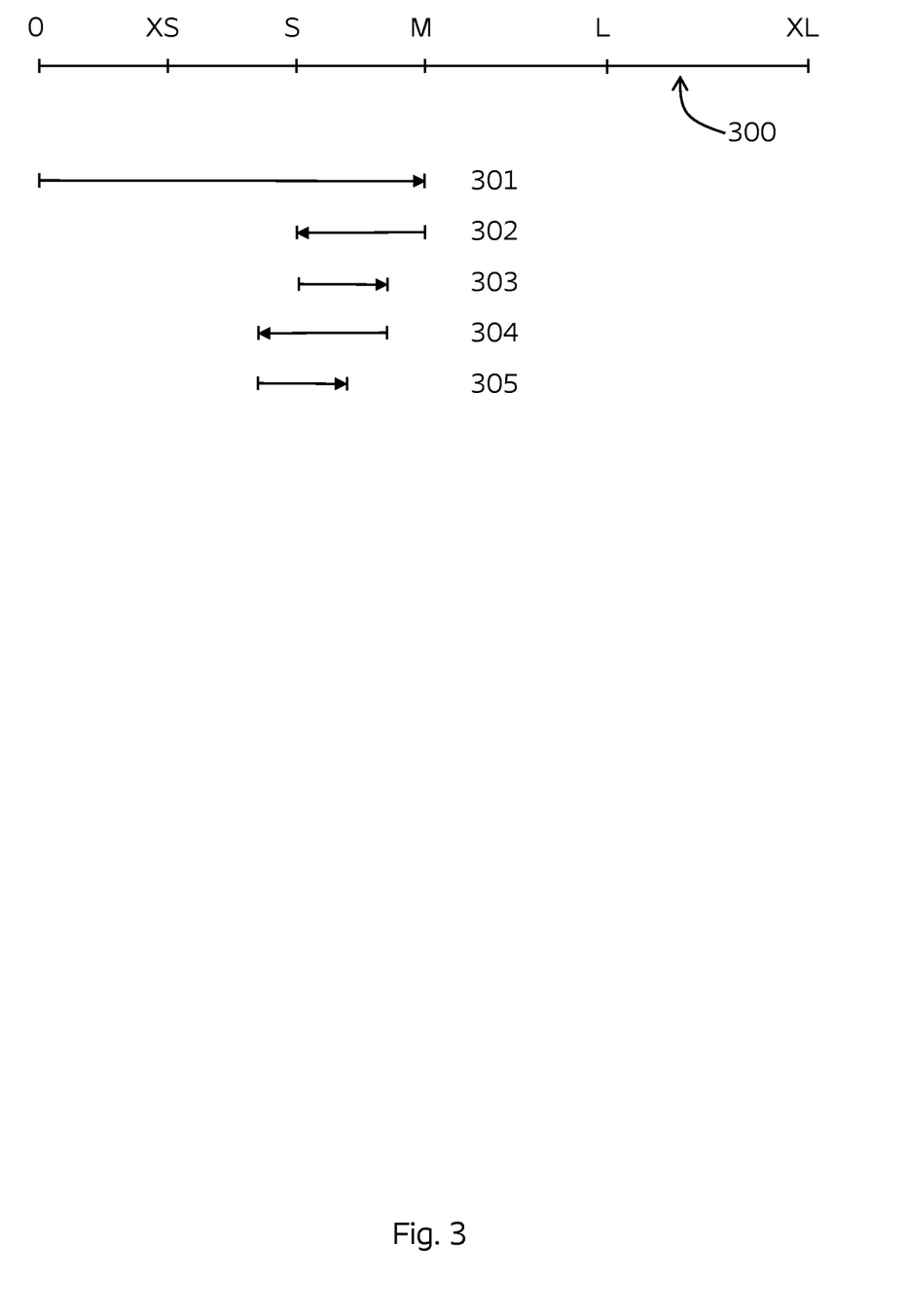
FIG. 3 illustrates a volumetric scale visualizing a process of deflating a balloon of embodiments of a bowel irrigation system.

FIG. 3 illustrates a volumetric scale 300 visualizing different sizes of a balloon, extending from 0 (zero) to XL, the selectable sizes being summarized in table 1 above. In the following, a user having selected a balloon of size M (medium) is considered. Such size can be selected in collaboration with a health care professional based on the user's comfort and requirements. In a first step 301, the balloon is inflated to the desired size by pumping the nominal volume corresponding to the selected size (M) into the balloon. In a second step 302, on the assessment of the pressure inside the balloon exceeding a first threshold value, the balloon is deflated by reducing the amount of liquid by a first amount of liquid, e.g. 20 ml. In a third step 303, on the assessment of the pressure inside the balloon falling below a second threshold value, the balloon is reinflated by a second amount of liquid, e.g. 17 ml. The second threshold value is lower than the first threshold value. In a fourth step 304, the second step 302 is repeated, i.e. the balloon is deflated by a first amount of liquid—if the pressure inside the balloon exceeds the first threshold value again. In a fifth step 305, the third step 303 is repeated, i.e. the balloon is reinflated by a second amount of liquid—if the pressure inside the balloon drops below the second threshold value again. The number of steps can vary and depends on the use, presence of peristaltic movements in the user and/or general need for adaption.

Figure 4:
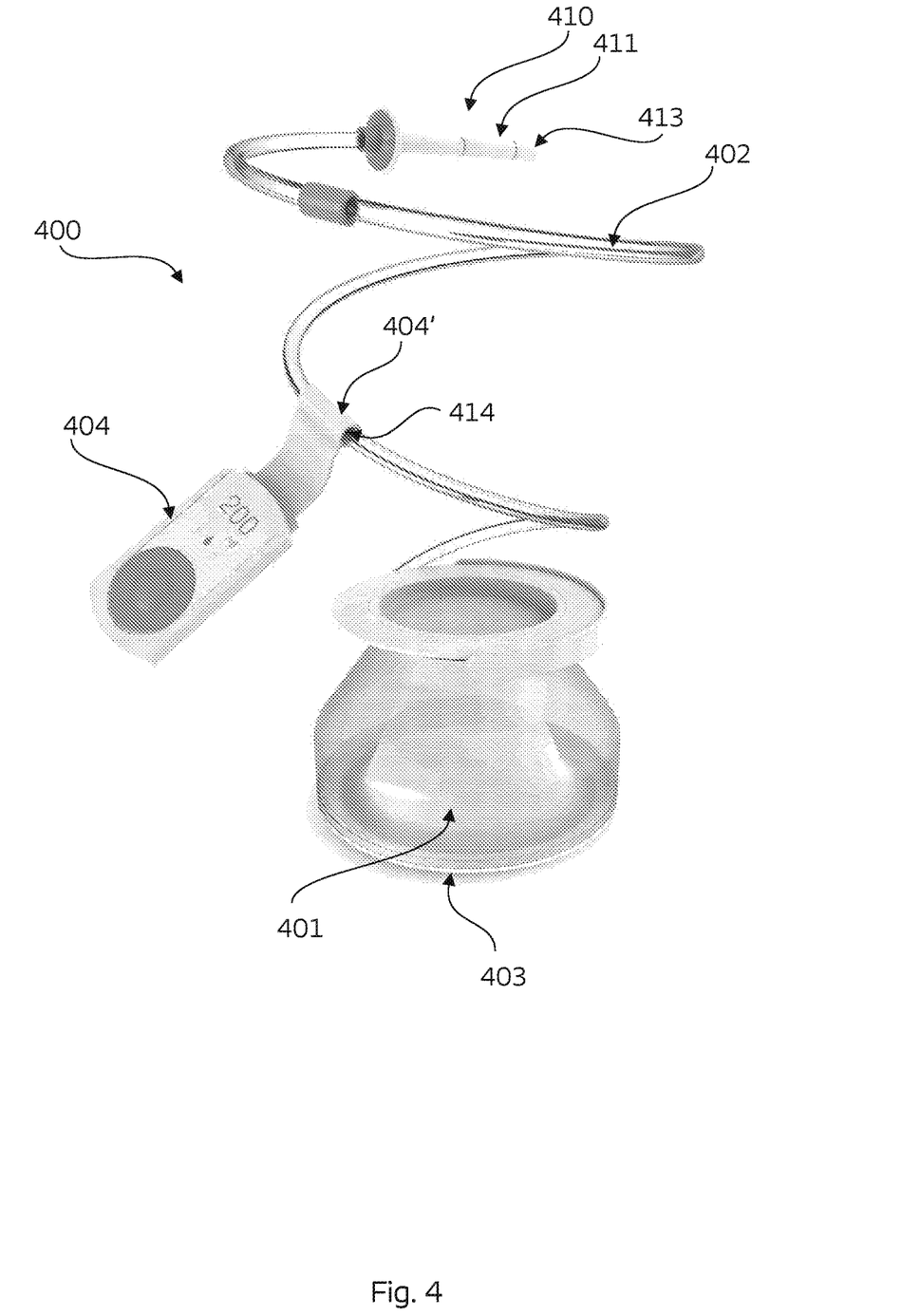
FIG. 4 illustrates one embodiment of a bowel irrigation system.

FIG. 4 illustrates a bowel irrigation system 400. The system 400 comprises a container 401 for holding a liquid, a catheter 410, a tubing 402 connecting the container 401 and the catheter 410, a pump 403 (not shown, but is preferably incorporated in the container, e.g. in the bottom), and a control unit 404 for controlling a flow of fluid in the system 400. The catheter 410 comprises an inflatable balloon 411. The tubing 402 can comprise a first and a second lumen, such that a separate fluid communication can be established between the container 401 and the balloon 411 through the first lumen, and between the container 401 and a proximal end 413 of the catheter 410 through the second lumen. Thereby, liquid held in the container 401 can be pumped selectably into the balloon 410, and through eyelets provided in the proximal end 413 of the catheter 410. By pumping liquid through the eyelets, said liquid irrigates the bowels when the catheter 410 is inserted in the rectum of a user. A pressure sensor 414 for assessing the pressure inside the balloon 411 can be arranged at any point between said balloon 411 and the pump 403, provided the pressure sensor 414 is in fluid communication with the interior of the balloon 411. In embodiments, the pressure sensor 414 is arranged by the control unit 404, e.g. by the hinged coupling 404', where the control unit 404 is in communication with the interior of the lumens of the tubing 402, and as such, in fluid communication with the interior of the balloon 411. Thereby, assessing the pressure by the control unit 404 is indicative of the pressure inside the balloon 411. In embodiments, the pressure sensor 414 is arranged in the control unit 404.

Figure 5:
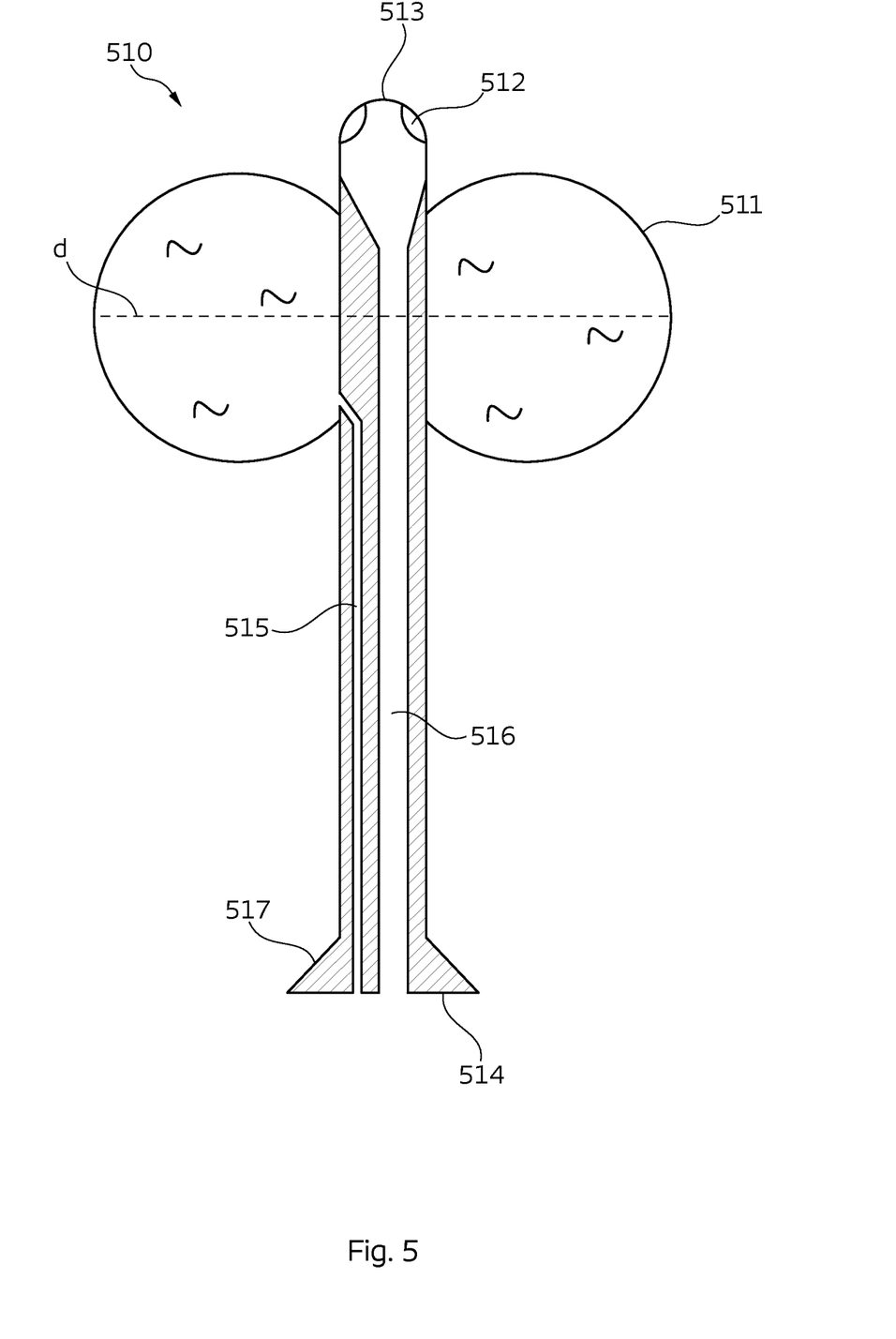
FIG. 5 illustrates a catheter of one embodiment of a bowel irrigation system.

FIG. 5 illustrates a cross sectional view of a catheter 510 of a bowel irrigation system. The catheter 510 comprises a proximal end 513 and a distal end 514. The proximal end 513 is provided with one or more eyelets 512 for facilitating irrigation of the bowels, when the proximal end 513 is inserted into the rectum of a user. The distal end 514 is provided with a connector 517 for connecting the catheter 510 to a tubing (not shown). The catheter 510 comprises an inflatable balloon 511. The balloon 511 encircles the catheter 510. In embodiments, the inflated balloon 511 is toroidal, i.e. having a shape resembling a torus. The diameter d of the balloon 510 can be measured as indicated, the diameter being the external diameter of the torus. The balloon 511 is inflatable by a liquid, e.g. liquid pumped from a container of the bowel irrigation system through the tubing. The catheter 510 comprises two channels; an inflation channel 515 and an irrigation channel 516. The channels can be in separate fluid communication with the container. The inflation channel 515 facilitates communication between the interior of the balloon 511 and the container of the bowel irrigation system, such that the balloon 511 can be inflated by liquid from the container. The irrigation channel 516 facilitates communication between the eyelets 512 of the proximal end 513 and the container of the bowel irrigation system, such that liquid can be pumped through the eyelets 512 and thereby facilitate irrigation of the bowels in a use situation. The balloon 511 is made of a flexible/elastic material for allowing a tight fit around the catheter in a non-inflated state, and for a flexible balloon in an inflated state. Thus, in a non-inflated state, the material of the balloon 511 wraps tightly around the catheter 510. Thereby, no creases are formed when the balloon is not inflated. A pressure sensor in fluid communication with the interior of the balloon 511 can be included in the catheter 510 for assessing the pressure inside the balloon 511.

Although particular features have been shown and described, it will be understood that they are not intended to limit the claimed invention, and it will be made obvious to those skilled in the art that various changes and modifications may be made without departing from the spirit and scope of the claimed invention. Accordingly, the specification and drawings are to be regarded in an illustrative rather than restrictive sense. The claimed invention is intended to cover all alternatives, modifications, and equivalents.

The invention claimed is:

1. A bowel irrigation system comprising a container adapted for containing a liquid, a catheter adapted for insertion into a rectum of a user, the catheter comprising a balloon inflatable by a first amount of liquid from the container for retaining the catheter inside the rectum, a tubing connecting the container and the catheter, a pump adapted for inflating the balloon with the first amount of liquid to an original retention size, and for pumping irrigation liquid from the container through the catheter to irrigate the rectum, and a control unit adapted for controlling the system, a pressure sensor adapted for sensing a first pressure inside the balloon, wherein the control unit instructs the pump to perform an auto-deflate scheme in response to a value of the first pressure exceeding a first threshold value, where the pump is operated to: remove a first volume of liquid out of the balloon when the first pressure inside the balloon is greater than a first threshold value, and automatically add a subsequent volume of liquid into the balloon to reinflate the balloon to a subsequent retention size, with the subsequent volume of liquid less than the first volume of liquid such that subsequent retention size is not greater than the original retention size, wherein the control unit instructs the pump to repeatedly perform the auto-deflate scheme, in response to the value of the first pressure exceeding the first threshold value, with the subsequent volume of liquid repeatedly decreasing until the balloon is emptied, wherein a first repetition of the subsequent volume of liquid reinflating the balloon during the repeatedly performed auto-deflate scheme is a volume larger than zero.

2. The bowel irrigation system according to claim 1, wherein the tubing comprises a first lumen communicating with the balloon and a second separate lumen having an exit port in a proximal end of the catheter; and a valve disposed in the first lumen and adapted to restrict a flow of the first amount of liquid into the balloon.

3. The bowel irrigation system according to claim 1, wherein the control unit is connected to the tubing at a location between the container and the catheter, with the control unit comprising a processor programmed to determine the first pressure from the pressure sensor, to compare the first pressure with the first threshold value, and to operate the pump after comparing the first pressure with the first threshold value.

4. The bowel irrigation system according to claim 1, wherein the pressure sensor is disposed in the control unit.

5. A method for controlling a size of an inflatable balloon of a catheter for a bowel irrigation system, the method comprising: providing a bowel irrigation system comprising a container, a catheter adapted for insertion into a rectum of a user, the catheter comprising an inflatable balloon for retaining the catheter inside the rectum, a tubing connecting the container and the catheter, a pump adapted for inflating the balloon and for irrigating the rectum, a control unit adapted for controlling a flow of fluid in the system, a pressure sensor adapted for assessing a pressure inside the balloon, and the method comprising the steps of inflating the balloon with a first amount of liquid to an original retention size by pumping the first amount of liquid from the container to the balloon through the tubing, sensing a first pressure inside the balloon with the pressure sensor, comparing the first pressure inside the balloon with a first threshold value, initiating an auto-deflate scheme, with the control unit, in response to a value of the first pressure exceeding a first threshold value, by removing a first volume of liquid from the balloon and automatically reinflating the balloon to a subsequent retention size with a subsequent volume of liquid, with the subsequent volume of liquid less than the first volume of liquid ensuring the subsequent retention size is not greater than the original retention size, and repeatedly initiating the auto-deflate scheme, with the control unit, in response to the value of the first pressure exceeding the first threshold value, with the subsequent volume of liquid repeatedly decreasing until the balloon is emptied, wherein a first repetition of the subsequent volume of liquid reinflating the balloon during the repeatedly performed auto-deflate scheme is a volume larger than zero.

6. The bowel irrigation system according to claim 1, wherein the pressure sensor is integrated with the catheter and disposed within the balloon.

7. The bowel irrigation system according to claim 1, wherein the control unit is connected to the tubing at a location between the container and the catheter, and the tubing comprises a first lumen communicating with the balloon and a second separate lumen having an exit port in a proximal end of the catheter, with the pressure sensor disposed in the control unit and communicating with the first lumen and so adapted to sense the first pressure inside the balloon.

8. The bowel irrigation system according to claim 1, wherein, when the first pressure inside the balloon is in a range between 4-7 psi, the control unit performs the auto-deflate scheme to remove 20 ml of liquid out of the balloon when the first pressure inside the balloon is greater than the first threshold value and automatically add 17 ml of liquid into the balloon to reinflate the balloon to the subsequent retention size that is smaller than the original retention size.

9. The bowel irrigation system according to claim 1, wherein the first amount of liquid for inflation of the balloon to the original retention size is in a range from 60-160 ml and the control unit performs the auto-deflate scheme to remove 20 ml of liquid out of the balloon when the first pressure inside the balloon is greater than the first threshold value and automatically add 17 ml of liquid into the balloon to reinflate the balloon to the subsequent retention size that is smaller than the original retention size.

10. The bowel irrigation system according to claim 1, wherein, when the first pressure inside the balloon is in a range between 6-10 psi, the control unit performs the auto-deflate scheme to remove 20 ml of liquid out of the balloon when the first pressure inside the balloon is greater than the first threshold value and automatically add 17 ml of liquid into the balloon to reinflate the balloon to the subsequent retention size that is smaller than the original retention size.

11. The bowel irrigation system according to claim 1, wherein the first amount of liquid for inflation of the balloon to the original retention size is in a range from 40-80 ml and the control unit performs the auto-deflate scheme to remove 20 ml of liquid out of the balloon when the first pressure inside the balloon is greater than the first threshold value and automatically add 17 ml of liquid into the balloon to reinflate the balloon to the subsequent retention size that is smaller than the original retention size.

12. The bowel irrigation system according to claim 1, wherein the control unit instructs the pump to reinflate the balloon to the subsequent retention size with the subsequent volume of liquid automatically following removal of the first volume of liquid.

* * * * *